United States Patent
Krems et al.

(10) Patent No.: US 10,465,494 B2
(45) Date of Patent: Nov. 5, 2019

(54) UNIVERSAL REMOTE CONTROL SYSTEM FOR HYDROCARBON RECOVERY TOOLS

(71) Applicant: Weatherford Technology Holdings, LLC, Houston, TX (US)

(72) Inventors: Klaus Krems, Langenhagen (DE); Michael Wiedecke, Salzhemmendorf (DE); Martin Helms, Burgdorf (DE); Benson Thomas, Pearland, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 239 days.

(21) Appl. No.: 14/733,671

(22) Filed: Jun. 8, 2015

(65) Prior Publication Data
US 2016/0076356 A1 Mar. 17, 2016

Related U.S. Application Data

(60) Provisional application No. 62/050,232, filed on Sep. 15, 2014.

(51) Int. Cl.
*E21B 19/16* (2006.01)
*E21B 44/00* (2006.01)
(Continued)

(52) U.S. Cl.
CPC .......... *E21B 44/005* (2013.01); *E21B 19/165* (2013.01); *E21B 43/12* (2013.01);
(Continued)

(58) Field of Classification Search
CPC ...... E21B 44/00; E21B 19/165; E21B 44/005; E21B 43/12; E21B 19/16–168;
(Continued)

(56) References Cited

U.S. PATENT DOCUMENTS 5,864,772 A * 1/1999 Alvarado ................ E21B 47/12
702/16
6,580,422 B1 * 6/2003 Reilly ................... G06F 3/1454
345/169

(Continued)

FOREIGN PATENT DOCUMENTS

CN 101026661 8/2007

OTHER PUBLICATIONS

PCT International Search Report and Written Opinion dated Nov. 19, 2015, for International Application No. PCT/US0215/049089.
(Continued)

*Primary Examiner* — George S Gray
(74) *Attorney, Agent, or Firm* — Patterson + Sheridan, LLP

(57) ABSTRACT

A system for controlling a set of tools for hydrocarbon recovery includes a remote controller and a device controller. The remote controller is communicatively coupled to the device controller. The device controller is generally configured to receive a command to operate one of the plurality of tools from the remote controller. Based on the command, the device controller generates one or more instructions executable by a controller associated with the one of the plurality of tools. The device controller transmits the one or more instructions to the one of the plurality of tools.

28 Claims, 15 Drawing Sheets

(51) Int. Cl.
*G05B 19/05* (2006.01)
*E21B 43/12* (2006.01)
*E21B 47/12* (2012.01)
*G06F 17/00* (2019.01)

(52) U.S. Cl.
CPC .............. *E21B 44/00* (2013.01); *E21B 47/12* (2013.01); *G05B 19/05* (2013.01); *G06F 17/00* (2013.01); *G05B 2219/1101* (2013.01)

(58) Field of Classification Search
CPC ......... E21B 47/12; G06F 17/00; G05B 19/05; G05B 2219/1101; G05B 15/00; G05B 15/02
USPC .......................................... 166/373; 700/275
See application file for complete search history.

(56) References Cited

U.S. PATENT DOCUMENTS

| | | | | |
|---|---|---|---|---|
| 7,860,593 | B2* | 12/2010 | Boone | E21B 44/00 700/97 |
| 2004/0195555 | A1* | 10/2004 | Bangert | E21B 19/165 254/418 |
| 2006/0106508 | A1* | 5/2006 | Liebl | G07C 5/008 701/31.4 |
| 2006/0143234 | A1 | 6/2006 | Beeson | |
| 2009/0145603 | A1 | 6/2009 | Coronado | |
| 2012/0118636 | A1 | 5/2012 | Koederitz | |
| 2012/0273230 | A1* | 11/2012 | Patterson | E21B 19/165 166/377 |
| 2013/0255446 | A1* | 10/2013 | Taggart | E21B 19/161 81/57.11 |
| 2014/0104074 | A1* | 4/2014 | Hickman | E21B 33/0355 340/854.6 |
| 2016/0053605 | A1* | 2/2016 | Abbassian | E21B 44/00 702/6 |

OTHER PUBLICATIONS

Australian Examination Report dated Nov. 30, 2017, for Australian Patent Application No. 2015318279.
EPO Office Action dated May 15, 2018, for European Application No. 15766364.2.
Australian Examination Report dated Aug. 23, 2018 for Australian Patent Application No. 2015318279.
EPO Office Action dated Nov. 21, 2018, for European Application No. 15766364.2.
Eurasian Patent Organization Office Action dated May 22, 2019, for Application No. 201790625(31).
EPO Extended European Search Report dated May 28, 2019, for European Application No. 19155615.8.

* cited by examiner

UNIVERSAL REMOTE CONTROL SYSTEM FOR HYDROCARBON RECOVERY TOOLS

CROSS-REFERENCE TO RELATED APPLICATIONS

This application claims benefit of U.S. Provisional Patent Application Ser. No. 62/050,232, entitled "Universal Remote Control System for Hydrocarbon Recovery Tools," filed 15 Sep. 2014 and assigned to the assignee hereof, the contents of which are incorporated by reference herein.

BACKGROUND OF THE INVENTION

Field of the Invention

Embodiments of the present invention generally relate to hydrocarbon recovery and, more particularly, to techniques and apparatus for updating a screen content and/or control scheme of a remote controller for controlling hydrocarbon recovery tools.

Description of the Related Art

Drilling tools, such as tongs, overdrive systems, elevators, positioning systems, mud buckets, and other tools used in oilfield operations, can be controlled by dedicated remote control panels or universal remote control panels. These control panels can be located, for example, in a rig control cabin or in locations accessible by equipment operators in control of a particular tool. Whether located in a control cabin or in various locations on the rig, the controllers may be connected to the drilling tools via a wired or wireless connection.

Different types of drilling tools may operate with different parameters. For example, a tongs system—which may be used to make or break drill pipes by torqueing two lengths of pipe together or breaking a connection between two tubulars—may operate using parameters such as an amount of torque to apply and a direction of rotation and may be commanded to clamp or release a tubular. An elevator system, which may raise and lower a drill pipe, may operate using parameters such as a maximum or minimum height and may be commanded to raise or lower a tubular. Mud buckets, which may be positioned to prevent drilling muds from being spilled on rig floors or other walking surfaces, may be operated by moving the bucket to one of a plurality of predetermined locations and may be either opened or closed. Positioning devices may operate using parameters such as a horizontal, vertical, and/or azimuthal deflection from a reference point (e.g., positioning on the x, y, and z axes).

With dedicated remote controllers, a controller may be connected with (e.g., hardwired to) a specific device and be configured to operate only the device to which the controller is connected or otherwise associated with. Multiple controllers may be employed to operate the variety of drilling tools used in well-drilling operations. For example, each tongs may have a dedicated remote controller; an overdrive system may have its own remote controller; another dedicated remote controller may be used for a mud bucket, and so on. The dedicated remote controllers may be associated with one or more tool controllers. Each of these dedicated controllers may be customized to control parameters used for the specific tool. If a new device is added to a rig, an additional dedicated controller is typically added to control the new device.

Universal remote controllers, such as a universal remote panel, can be used to control a variety of tools using the same type of remote controller. A universal remote controller, for example, can be used to control tongs, overdrive systems, elevators, positioning systems, mud buckets, and other tools that can be used in oilfield drilling and other hydrocarbon recovery operations. If a new tool is added to a rig, the software of both the universal remote controller and the tool controller associated with the new tool is typically updated in order to support the new tool.

SUMMARY OF THE INVENTION

Embodiments of the present invention generally relate to updating the screen content and/or control scheme of a wireless or wired remote panel in response to modifications to functionality of one or more tools in a set of tools for hydrocarbon recovery or additions (or deletions) of one or more tools to the set of tools. Updating the screen content and/or control scheme of the remote panel such that control inputs may have new functionality provides for the continued use of the panel without replacing or manually updating the panel or adding additional remote panels. As used herein, the term "modifications" generally refers to additions, deletions, and/or other changes.

One embodiment of the present invention is a method for controlling a set of tools for hydrocarbon recovery. The method generally includes receiving, at a control device from a remote interface associated with the control device, a first signal; altering, at the control device, a screen content for the remote interface to display based on the first signal; sending, from the control device to the remote interface, a second signal with a representation of the altered screen content; receiving, at the control device, new information for at least one of an existing tool in the set of tools and a new tool; updating, at the control device, the screen content based on the new information; and sending, from the control device to the remote interface, a third signal with a representation of the updated screen content for the remote interface to display.

Another embodiment of the present invention is a system for hydrocarbon recovery. The system generally includes a control device and a remote interface associated with the control device. The control device may be configured to receive a first signal from the remote interface; alter a screen content for the remote interface to display based on the first signal; send, to the remote interface, a second signal with a representation of the altered screen content; receive new information for at least one of an existing tool in the set of tools and a new tool; update the screen content based on the new information; and send, to the remote interface, a third signal with a representation of the updated screen content for the remote interface to display.

In some embodiments, the remote interface may comprise a display configured to display menu screens, wherein the updated screen content comprises a new menu screen for the new tool or a new feature (e.g., a new parameter field) on one of the menu screens for the existing tool. The display may be a touchscreen. In some embodiments, the remote interface may further include a first joystick configured to navigate the menu screens and select various parameters, and a second joystick configured to remotely control operation of the existing tool or the new tool.

In some embodiments, the remote interface may be a wireless remote panel. The wireless remote panel may comprise one or more antennas configured to at least one of receive the first signal, receive the third signal, and send the second signal.

In some embodiments, the remote interface may be a smartphone, a personal digital assistant (PDA), or a tablet.

In some embodiments, the control device may comprise a programmable logic controller (PLC).

Yet another embodiment of the present invention is a control device for controlling a set of tools for hydrocarbon recovery. The control device generally includes a processing system and a memory connected with the processing system. The processing system may be configured to receive, from a remote interface associated with the control device, a first signal; alter a screen content for the remote interface to display based on the first signal; send, to the remote interface, a second signal with a representation of the altered screen content; receive new information for at least one of an existing tool in the set of tools and a new tool; update the screen content based on the new information; and send, to the remote interface, a third signal with a representation of the updated screen content for the remote interface to display. The memory may be configured to store the screen content.

Yet another embodiment of the present invention is a method for controlling a tool for hydrocarbon recovery. The method generally includes receiving, at a control device from a remote interface associated with the control device, a first signal; sending, from the control device to the tool for hydrocarbon recovery, a control signal based on the first signal; receiving, at the control device, new information for the tool; updating, at the control device, a screen content for the remote interface to display based on the new information; and sending, from the control device to the remote interface, a second signal with a representation of the updated screen content for the remote interface to display.

Yet another embodiment of the present invention is a method for controlling a tool at a work location. The method generally includes transmitting a first signal representative of a menu of options from a control device to a remote interface; receiving a second signal representative of a selection from the menu of options at the control device from the remote interface, wherein the selection represents a selection of a first tool in the set of tools; receiving a third signal representative of a first operation command at the control device from the remote interface; transmitting a fourth signal representative of the first operation command from the control device to the first tool, thereby causing the first tool to operate; receiving a fifth signal representative of a selection from the menu of options at the control device, wherein the selection represents a selection of a second tool in the set of tools; receiving a sixth signal representative of a second operation command at the control device from the remote interface; and transmitting a seventh signal representative of the second operation command from the control device to the second tool, thereby causing the second tool to operate.

Yet another embodiment of the present invention is a method for controlling a tool at a work location. The method generally includes transmitting a first signal representative of a first menu of options from a control device to a remote interface; receiving a second signal representative of a first selection from the first menu of options at the control device from the remote interface, wherein the first selection represents a choosing of a first tool out of a set of tools; transmitting a third signal representative of a second menu of options from the control device to the remote interface, wherein the second menu of options represents operation commands for the first tool; receiving a fourth signal representative of a first operation command at the control device from the remote interface; transmitting a fifth signal representative of the first operation command from the control device to the first tool, thereby causing the first tool to operate; receiving a sixth signal representative of a second selection from the first menu of options at the control device from the remote interface, wherein the second selection represents a choosing of a second tool out of the set of tools; transmitting a seventh signal representative of a third menu of options from the control device to the remote interface, wherein the third menu of options represents operation commands for the second tool; receiving an eighth signal representative of a second operation command at the control device from the remote interface; and transmitting a ninth signal representative of the second operation command from the control device to the second tool, thereby causing the second tool to operate.

Yet another embodiment of the present invention is a method for controlling a set of tools for hydrocarbon recovery. The method generally includes transmitting, from a control device to a remote interface, a representation of a screen content for a first tool for hydrocarbon recovery; receiving, at the control device from the remote interface, a first signal based on a control input at the remote interface; and transmitting, from the control interface to a second tool for hydrocarbon recovery, a control signal based on the control input, wherein the control signal operates the second tool.

Yet another embodiment of the present disclosure provides a hydrocarbon recovery system. The system generally includes a remote controller and a control device communicatively coupled to the remote controller. The control device may receive a command to operate one of a plurality of hydrocarbon recovery tools from the remote controller. The control device generates one or more instructions executable by a controller associated with the one of the plurality of tools and transmits the one or more instructions to the one of the plurality of tools.

Another embodiment of the present disclosure provides a method for controlling a plurality of tools in a hydrocarbon recovery system. The method generally includes receiving, from a remote control device, one or more command related to operation of at least one of the plurality of tools; generating, based on the received command, one or more instructions executable by the at least one of the plurality of tools to perform an operation specified by the received command; and transmitting the one or more instructions to the at least one of the plurality of tools to cause the at least one tool of the plurality of tools to perform the operation.

Another embodiment of the present disclosure provides a method for controlling a plurality of tools in a hydrocarbon recovery system. The method generally includes transmitting, to a control device, one or more commands related to operation of at least one of a plurality of hydrocarbon recovery tools connected to the control device; and receiving, from the control device, information indicating that the at least one of a plurality of tools performed an operation based on the one or more commands.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide techniques and apparatus for controlling a set of tools for hydrocarbon recovery while allowing a remote controller (e.g., a remote control panel) to be updated as a tool or tool functionality is added, removed, or modified without adding additional hardware controllers or manually updating the firmware or software of the remote controller. Updating the remote controller may entail providing updated screen content and/or control schemes for a tool or tool functionality that has been added, removed, or modified, such that an operator can utilize the remote controller to control any of various tools according to the added, removed, or modified tool or tool functionality.

An Example Tool Control System

Figure 1A:
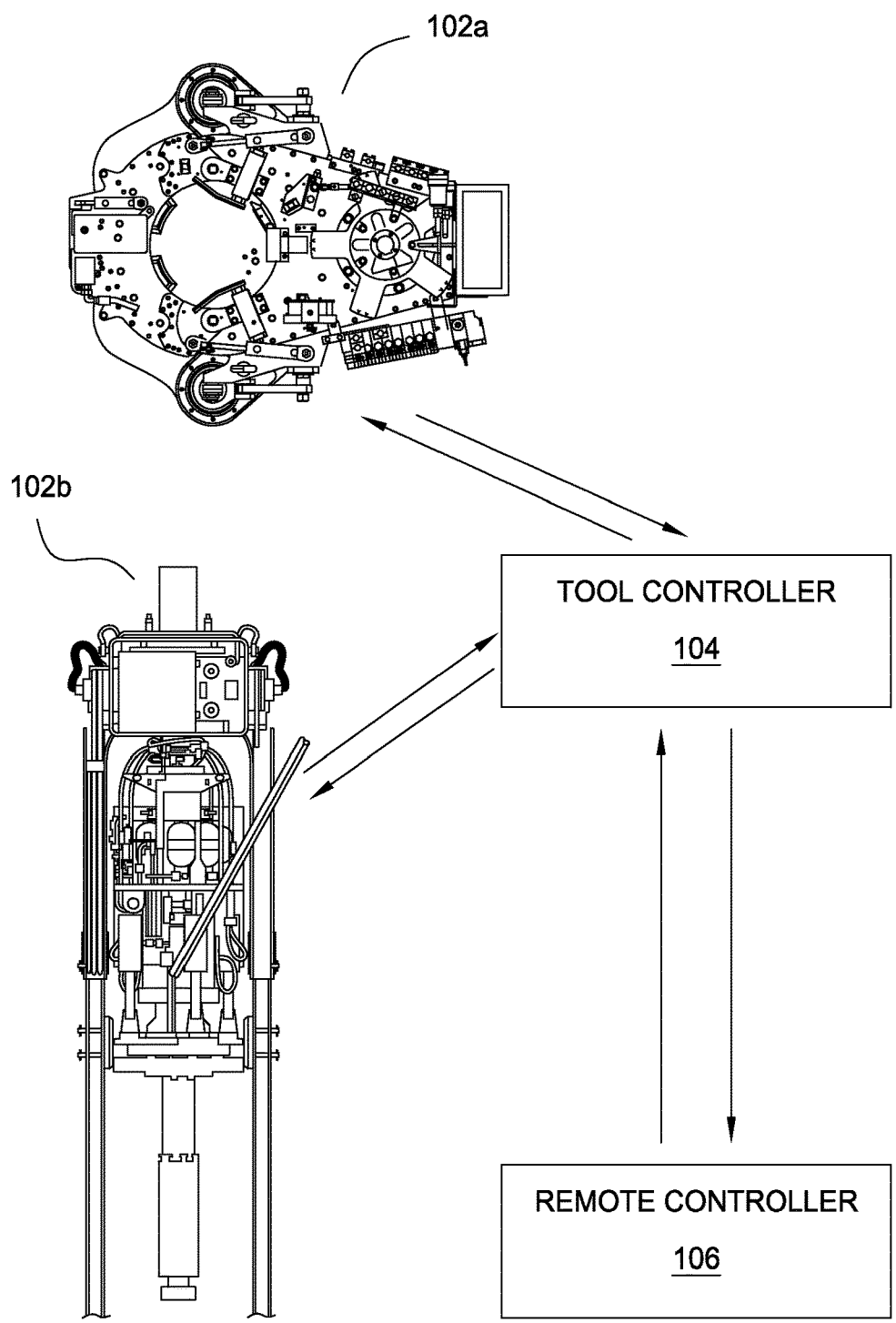
FIG. 1A illustrates an example tool control system, in accordance with embodiments of the present invention.

FIG. 1 illustrates an example tool control system 100 in accordance with an embodiment of the present invention.

Tool control system 100 may include a variety of tools 102, a tool controller 104, and a remote controller 106.

Tools 102 may include any of various suitable tools for hydrocarbon recovery operations, such as tongs 102a, overdrive systems 102b, elevators, mud buckets, positioning systems, compensators, draw works, top drives, casing making devices, gripping devices, spiders, mud pumps, pickup and laydown tools, interlocks, cement heads, release balls and plugs, control line positioning tools, blowout preventers (BOPs), bails, and the like. Tools 102 may be communicatively coupled to a tool controller 104, and the tool controller may be communicatively coupled to remote controller 106. Tool controller 104 may support bi-directional communications via one or more communications links between tools 102 and tool controller 104, which may allow tool controller 104 to transmit commands to tools 102 or receive information from the tools. For example, commands transmitted from tool controller 104 to a tool 102 may change an operating parameter of the tool, cause the tool to start or stop performing a function, or instruct the tool to transmit information (e.g., operating parameters or sensor information) to tool controller 104.

A bi-directional communications link may also be supported between tool controller 104 and remote controller 106. The bi-directional communications link may allow tool controller 104 to transmit information (e.g., device operating parameters from a tool 102) for display on remote controller 106. This may also allow remote controller 106 to transmit commands to cause tool controller 104 to change the operating parameters of a tool 102 or cause tool 102 to start or stop performing a function. Remote controller 106 may be a hardware remote control device or a control system accessible through a graphical human-machine interface (HMI), such as a web interface or an HMI component of a supervisory control and data acquisition (SCADA) system.

Figure 1B:
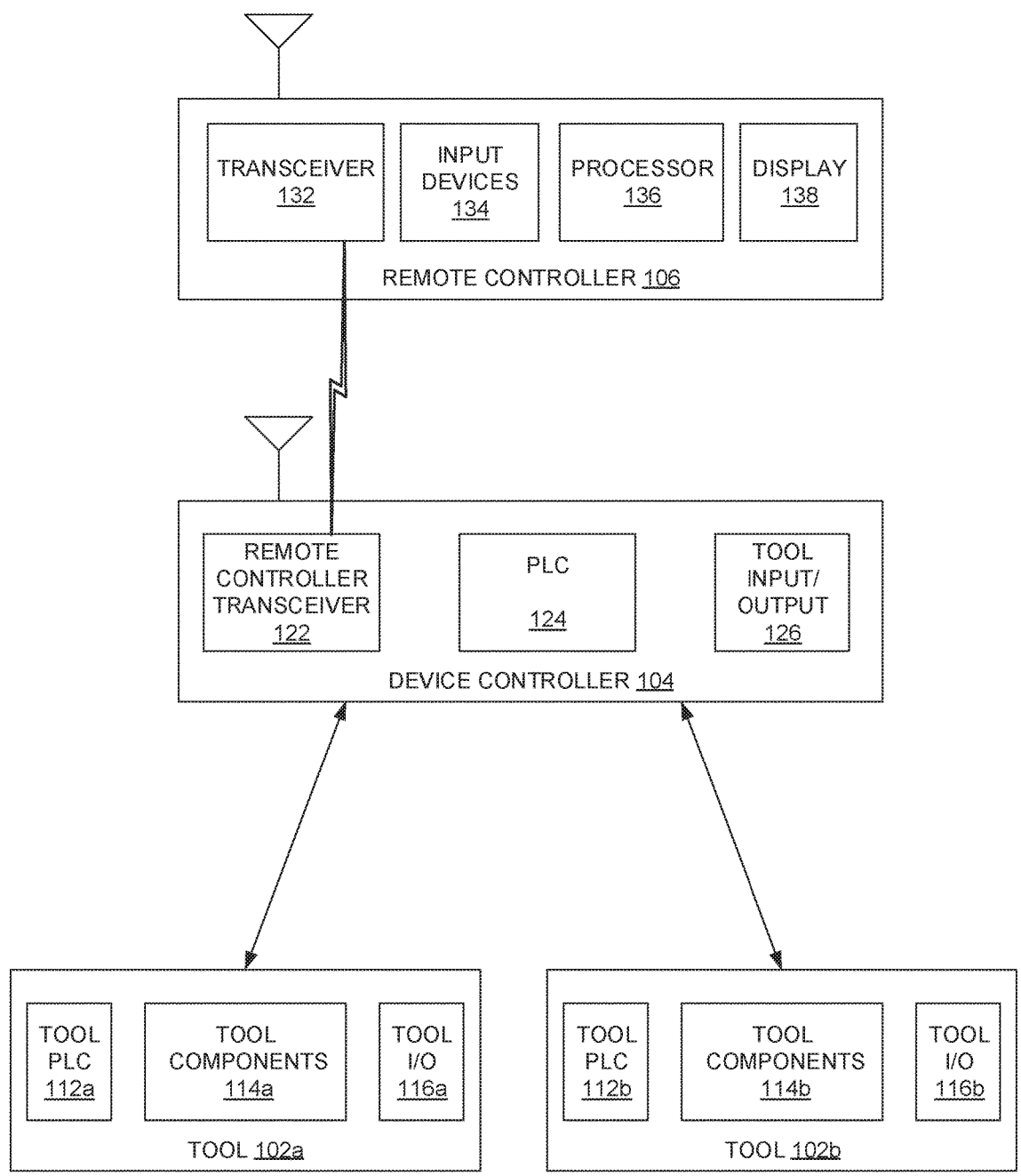
FIG. 1B is a block diagram illustrating components in a hydrocarbon recovery tool control system, in accordance with embodiments of the present invention.

FIG. 1B is a block diagram of an example tool control system 100, in accordance with aspects of the present disclosure. As illustrated, hydrocarbon recovery tool control system 100 includes a plurality of tools 102, a device controller 104, and a remote controller 106.

Remote controller 106 generally includes transceiver 132, input devices 134, processor 136 and display 138. In some embodiments, transceiver 132 may support communications via a wired connection, such as a 1000BASE-T (gigabit Ethernet) connection, a serial connection (e.g., an RS-232 connection), or some other wired connection. In some embodiments, transceiver 132 may be a wireless transceiver and may support communications via a variety of wireless protocols. For example, transceiver 132 may communicate in an 802.11 (Wi-Fi) network, an 802.16 (WiMax) network, a Uniform Terrestrial Network Access (UTRA) network (i.e., a network supporting cellular communications using the High Speed Packet Access standard), an Evolved Uniform Terrestrial Network Access (E-UTRA) network (i.e., a network supporting cellular communications using the Long Term Evolution (LTE) or LTE-Advanced standards), or other wireless protocols.

In some embodiments, remote controller 106 may receive one or more screens from device controller 104 and display the one or more screens on display 138. A user may manipulate one or more input devices 134 to modify data displayed on display 138. The data may generally relate to the operation of one or more tools in a hydrocarbon recovery system. Based on user input from the one or more input devices 134, processor 136 may generate one or more commands and transmit the one or more commands to device controller 104 via transceiver 132.

Device controller 104 generally includes a transceiver 122, programmable logic computer (PLC) 124, and one or more tool input/output devices 126. In some embodiments, device controller 104 may be a fixed control cabinet located in a control room of a drilling rig. In other embodiments, device controller 104 may be a portable control cabinet.

Device controller 104 may be communicatively coupled to remote controller 106 via transceiver 122. Transceiver 122 may receive one or more commands from remote controller 106 related to operation of one of the one or more tools 102. Based on the received one or more commands, PLC 124 may generate one or more instructions to cause at least one of the one or more tools to perform an action specified by the one or more commands. After PLC 124 generates the one or more instructions, PLC 124 may output the one or more instructions to one of the tool input/output devices 126 for transmission to the at least one of the one or more tools.

Device controller 104 may be connected to one or more tools 102 via a variety of tool input/output devices 126. In some cases, tool input/output devices 126 may include a wired electrical or optical data transceiver, such as a 1000BASE-T (gigabit Ethernet) interface or a fiber channel interface. Tool input/output devices 126 may also include wireless transceivers, such as transceivers supporting communications using the 802.11 (Wi-Fi), 802.16, UTRA, E-UTRA, or other standards. Instructions transmitted via an electrical or optical connection between device controller 104 and a tool 102 may include communications compliant with an industrial communications protocol, such as PROFIBUS or MODBUS. In some cases, tool input/output devices may include an analog current loop carrying current levels for configuring operation of tool 102. For example, the current loop may be a 4-20 milliamp loop or a 10-50 milliamp loop, where the lowest current corresponds to a minimum value of a parameter and the highest current corresponds to a maximum value of a parameter.

In some cases, tool input/output devices may include one or more fluid power units in fluid communication with one or more of the one or more of tools 102. The fluid power units may include, for example, hydraulic pumps or pneumatic power units. PLC 124 may be communicatively coupled to the fluid power units (e.g., via an actuator) and may generate one or more instructions to cause the fluid power units to increase or decrease fluid pressure at one of the one or more of tools. For example, for hydraulically or pneumatically driven tools, PLC 124 may generate a first instruction to start operation of the tool by causing a fluid power unit associated with one of the one or more tools 102 to introduce an amount of fluid pressure to the tool. When PLC 124 determines that tool 102 has completed the requested operation, PLC 124 may generate a second instruction to cause the fluid unit to release fluid pressure at the tool.

In some cases, tools 102 generally include a tool PLC 112, tool components 114, and tool input/output devices 116. Tool components 114 and tool input/output devices may be communicatively coupled to tool 102. Tool input/output devices 116 may receive one or more instructions to command operation of tool 102. Based on the received one or more instructions, tool PLC 112 can cause tool components 114 to perform an action (e.g., perform a make or break operation on a tubular string, move a mud bucket, etc.). In some cases, sensors associated with tool components 114 may generate data related to a current state of tool 102 and, via tool input/output devices 116, transmit the data to device controller 104, where the data may be logged and transmitted to remote controller 106 for display.

Figure 1C:
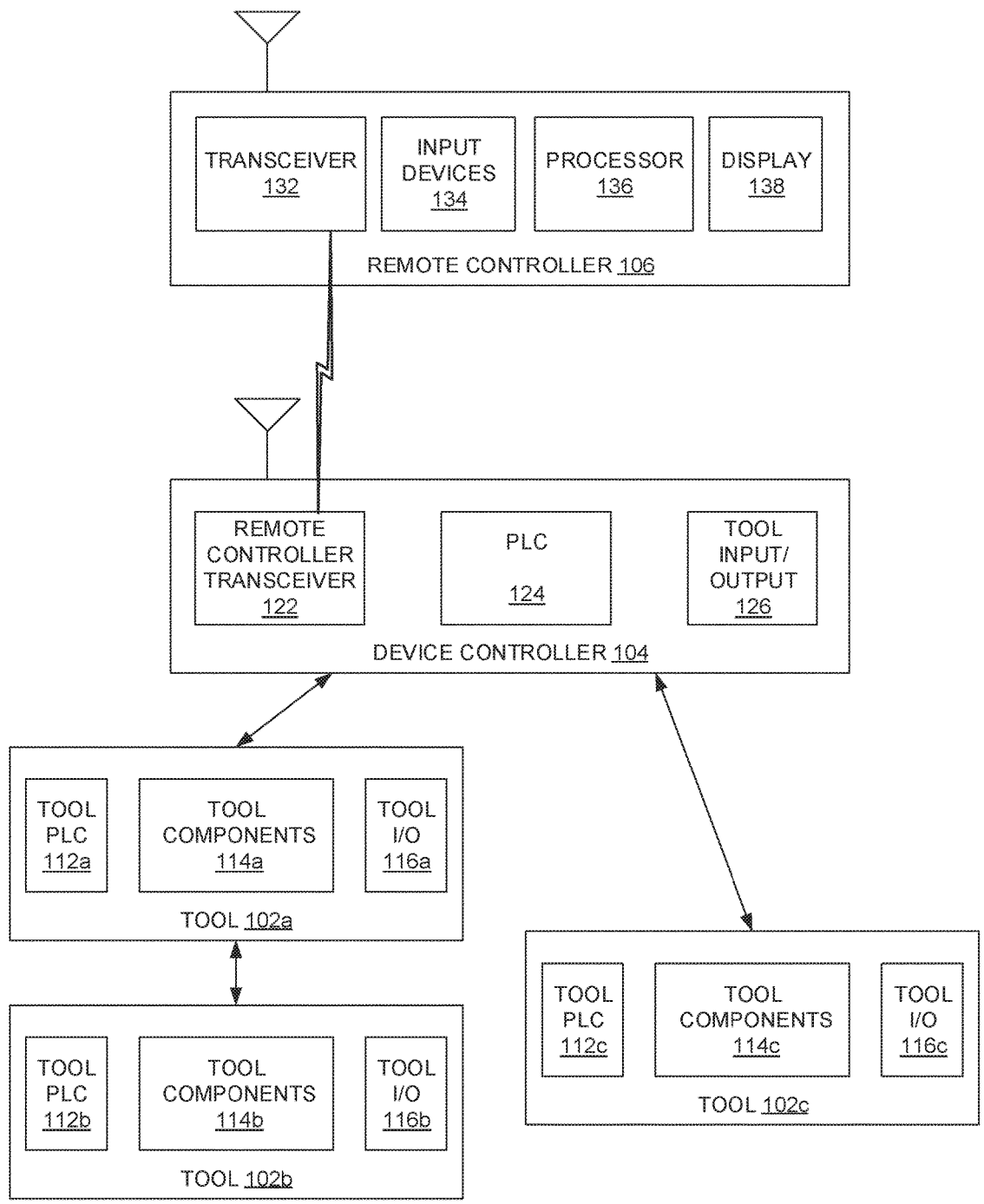
FIG. 1C is a block diagram illustrating components in a hydrocarbon recovery tool control system with tools communicatively coupled to a control device through another tool, in accordance with embodiments of the present invention.

In some cases, as illustrated in FIG. 1C, tools may be connected to device controller 104 via another tool. For example, tool 102b is connected to tool 102a, which is communicatively connected to device controller 104. Tool 102a may be configured to provide a fluid communication conduit (e.g., a hydraulic or pneumatic pass-through), a power conduit, and/or a data connection to tool 102b. In an aspect, tool 102a may be a top drive, and tool 102b may be a tool connected to the top drive.

Device controller 104 may generate one or more instructions to command operation of tool 102b, and transmit the instructions to tool 102a. In aspects where the instructions comprise data signals transmitted via an electrical or optical medium, the instructions may indicate the device for which the instructions are intended. Tool PLC 112a at tool 102a may read the one or more instructions received from device controller 104 and determine whether or not the instructions are intended for operation of tool 102a. If the instructions are intended for operation of tool 102a, tool PLC 112a may take one or more actions to cause tool components 114a to perform according to the instructions. If, however, the instructions are intended for operation of tool 102b, tool PLC 112a may cause the instructions to be transmitted to tool 102b via a tool I/O device 116a (e.g., a data transceiver). At tool 102b, the instructions may be received at a tool I/O device 116b and processed by tool PLC 112b to determine whether the instruction is intended for operation of tool 102b or for yet another tool connected below tool 102b.

In some cases, tool I/O devices 116 may comprise a fluid communication conduit. Fluid pressure generated by device controller 104 and transmitted to tool 102a may be passed through a tool I/O device 116a to tool 102b. Tool 102b may be actuated and controlled solely by the supply of pressurized fluid from device controller 104 and routed through one or more other tools. In some cases, PLC 112b may be an optional component of tool 102b.

In some embodiments, remote controller 106 may be located in a driller's cabin, which may be remote from the rigfloor (i.e., an explosive zone). Device controller 104 may be located away from the rigfloor and packaged in a standard housing or located at the rigfloor and packaged in an explosion-proof housing. Remote controller 106 may be communicatively coupled to device controller 104 via a wired or wireless electrical connection or a fiber connection, as discussed above. Device controller 104 may be connected to one or more tools 102 using electrical, hydraulic, and/or pneumatic connections. In some cases, as described above, some tools may be coupled to other tools and communicatively coupled to device controller 104 through the other tools.

In some embodiments, remote controller 106 and device controller 104 may be located at the rigfloor. In such a deployment, both device controller 104 and remote controller 106 may be housed in explosion-proof housings. In some cases, device controller 104 and remote controller 106 may be co-located in a same housing. In such a deployment, device controller 104 may communicate electrically with PLCs associated with each of the plurality of tools. Instructions transmitted from device controller 104 to a tool 102 may include instructions to cause a PLC associated with tool 102, for example, to actuate one or more electrical and/or fluid power units to perform a specified action.

Example Remote Panel

Figure 2:
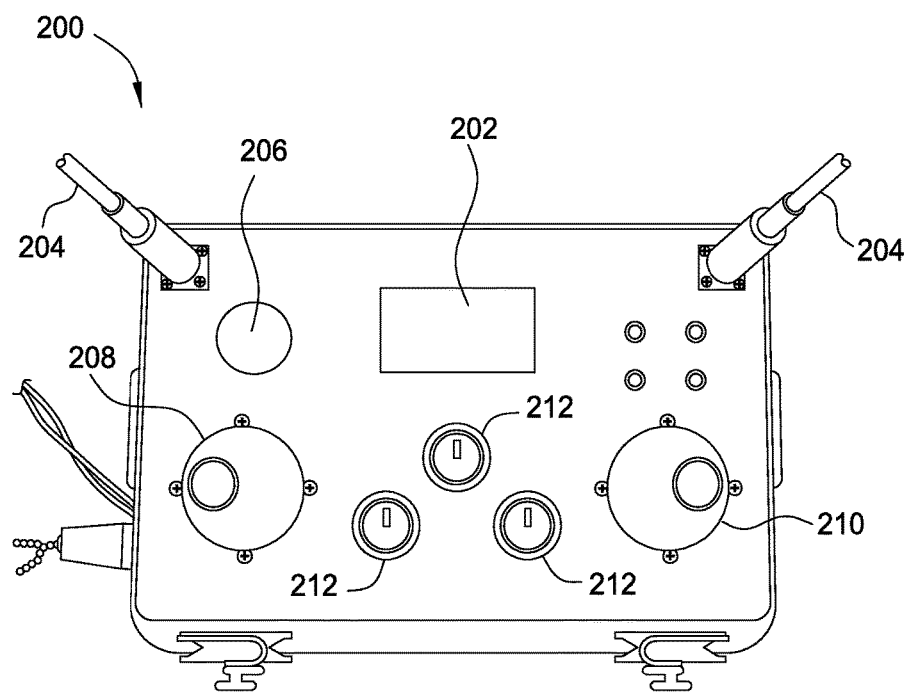
FIG. 2 illustrates an example remote control panel, in accordance with embodiments of the present invention.

FIG. 2 illustrates an example remote control panel 200, in accordance with embodiments of the present invention.

Remote control panel 200 may operate as a remote controller 106 and may be a universal remote control panel capable of controlling several tools. Remote control panel 200 may include a display 202, one or more wireless antennas 204, an emergency stop button 206, a first joystick 208 (or other directional controller), a second joystick 210 (or other directional controller), and one or more optional legacy controls 212 (e.g., rotary switches). Display 202 may be configured to display a plurality of parameters and commands for a tool being currently controlled by remote control panel 200. The contents of display 202 may change depending on the type of tool selected. For example, display 202 may present a first plurality of operating parameters and commands if a first tool (e.g., tongs) is selected, a second plurality of operating parameters and commands if a second tool (e.g., an overdrive system) is selected, a third plurality of operating parameters and commands if a third tool (e.g., a mud bucket) is selected, and so on.

Remote control panel 200 may communicate with one or more tool controllers 104 via one or more wireless antennas 204. As illustrated, remote control panel 200 communicates via two antennas 204 for antenna diversity; however, any number of antennas may be used.

Emergency stop button 206 may be used to stop one or more tools controlled by remote control panel 200 via one or more tool controllers 104. If emergency stop button 206 is activated, remote control panel 200 may transmit, via wireless antennas 204, one or more commands to tool controller(s) 104 commanding the tool controller(s) 104 to stop a particular tool or all tools controlled by tool controller(s) 104 (e.g., by discontinuing power flow to one or more tools). In this manner, the tool(s) can be quickly shutdown to prevent damage to the tool(s) or injury caused by the tool(s), for example.

Selection and modification of parameters may be performed using first and second joysticks 208, 210. One or both of first and second joysticks 208, 210 may act as a toggle or selection button to perform an action (e.g., returning a tool to a default position, commanding a tool to start or stop operations, and so on). For example, first joystick 208 may be configured to change parameter values (e.g., by moving the first joystick up or down) or move the focus of inputs from first joystick 208 from one field to another (e.g., by moving the first joystick left or right), while second joystick 210 may be configured to command the performance of one or more hardware actions. The functionality of first and second joysticks 208, 210 may change based on the status of remote control panel 200 (e.g., a powering on state, an error handling state), the tool selected, and the mode in which remote control panel 200 is operating in (e.g., a data mode, where parameters of a tool can be viewed and/or modified, or a control mode, where a tool can be commanded to start or stop operations).

Remote control panel 200 may optionally have one or more "legacy" device controls 212. As illustrated in FIG. 2, remote control panel 200 has three legacy device controls 212; however, any desired number of legacy device controls 212 may be present on remote control panel 200. Legacy device controls 212 may be used to operate various functions on one or more tools. For example, legacy device controls 212 may be used to open or close tongs, switch tongs or an overdrive controller from make mode (i.e., a mode in which two tubulars are connected to each other) to break mode (i.e., a mode in which two tubulars are disconnected from each other), change control from manual control to automatic control, or other functionality as desired. Legacy device controls 212 may be used in lieu of or in conjunction with display 202 and first and second joysticks 208, 210.

Figure 3:
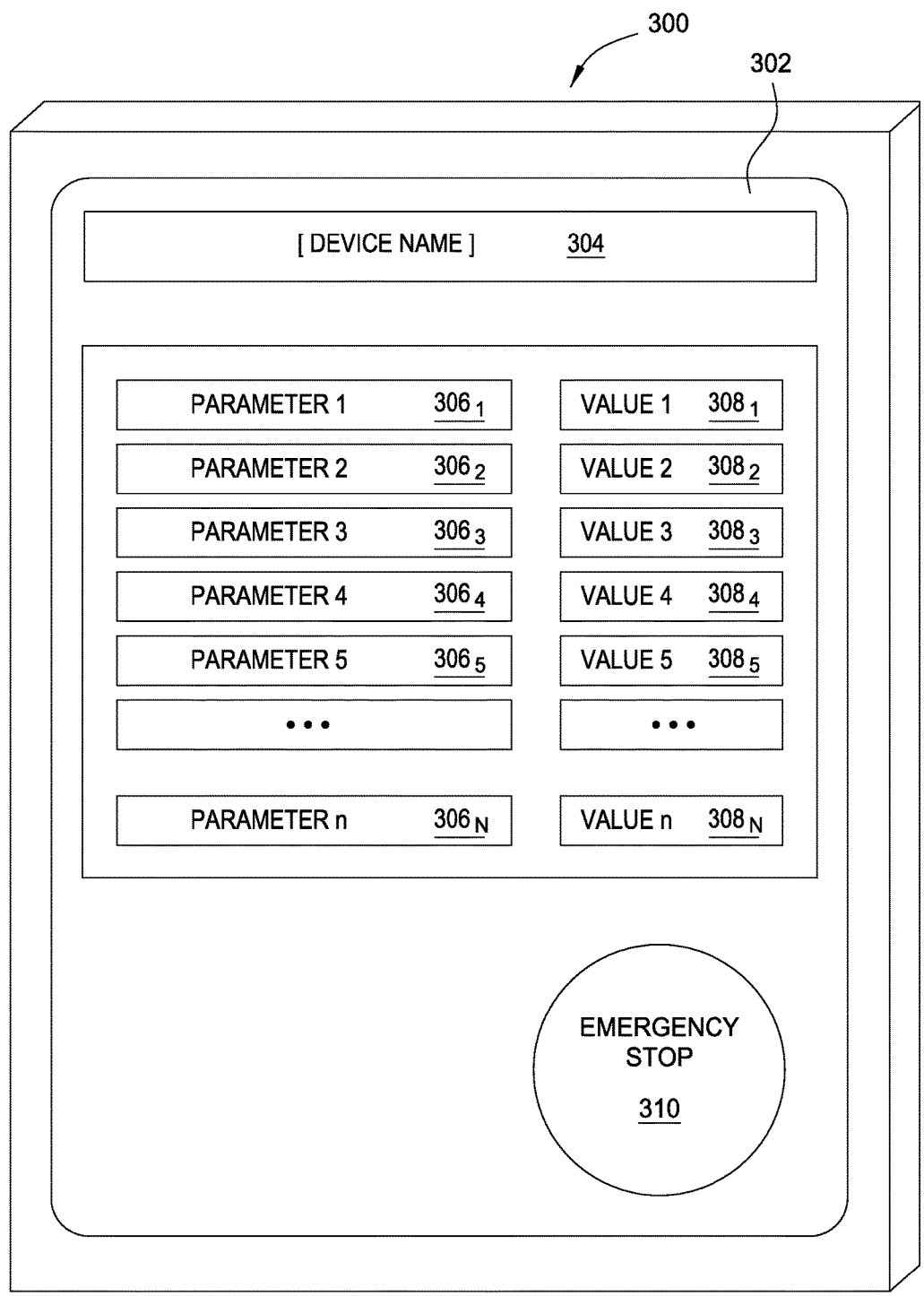
FIG. 3 illustrates an example interface for controlling one or more tools for hydrocarbon recovery, in accordance with embodiments of the present invention.

As an alternative (or a supplement) to remote control panel 200, FIG. 3 illustrates an example human-machine interface (HMI) that may be used to control a plurality of tools, in accordance with embodiments of the present invention. A display device 300 may be used to display HMI 302. Display device 300 may be a smartphone, tablet, a personal digital assistant (PDA), monitor, or any other visual display device as desired and may include one or more network interfaces that may be used to connect to and communicate with one or more tool controllers 104. The display for such a device may be a touchscreen and may accept input through a stylus, touch, proximity of a finger, or a combination thereof. Inputs generated on a touchscreen may be used to interact with data elements presented on HMI 302. For example, display device 300 may utilize a wireless local area network (WLAN) interface (e.g., an IEEE 802.11 interface), a cellular network interface (e.g., Long Term Evolution (LTE) or Universal Mobile Telecommunication System (UMTS) interfaces), personal area network (PAN) interfaces, or other network interfaces, as desired.

HMI 302 may be configured to display a plurality of fields corresponding to the various tools connected with the one or more tool controllers 104. A user can select a device, for example, using a drop-down menu 304 (as illustrated), a graphical representation of the device, or any other manner of selecting a device on a graphical user interface (GUI). After a device is selected, HMI 302 may be populated with one or more parameter fields $306_1$-$306_n$, which may present parameters or operations of the selected device. Parameter fields $306_1$-$306_n$ may each have a corresponding value field $308_1$-$308_n$. Each of the value fields 308 may be an editable text field (e.g., for changing the value of a parameter), a toggle button (e.g., for switching operating modes), or some other suitable graphical field. HMI 302 may further have an emergency stop button 310, which may act similarly to emergency stop button 206 of remote control panel 200.

Example Implementation of a Remotely Controlled Tool System

Figure 4A:
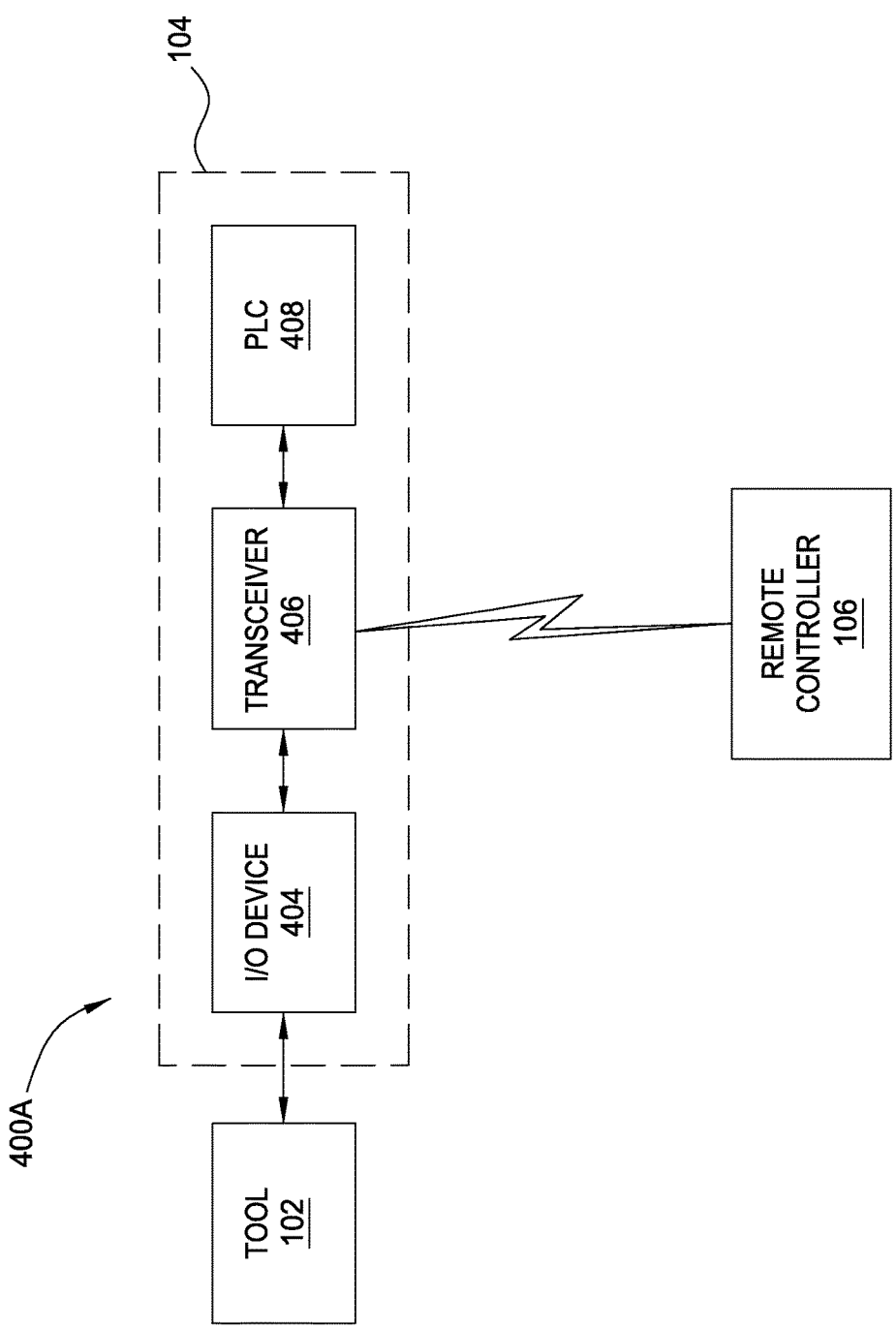
FIG. 4A illustrates an example tool control system with a wireless receiver, in accordance with embodiments of the present invention.

FIG. 4A illustrates a block diagram of a remotely controlled tool system 400A, in accordance with embodiments of the present invention. As illustrated, tool controller 104 may comprise an input-output (I/O) device 404, a transceiver 406, and a programmable logic controller (PLC) 408. I/O device 404, transceiver 406, and PLC 408 may be connected with each other, for example, via a communications bus. For example, I/O device 404, transceiver 406, and PLC 408 may communicate with each other via a communications bus over which messages compliant with the MODBUS protocol, PROFIBUS protocol, or other any other desired communications protocol, may be transmitted.

Remote controller 106 may be connected with tool controller 104 via a wired or wireless connection with transceiver 406. Transceiver 406 may have one or more antennas and may receive commands from remote controller 106 at the one or more antennas to change parameters of a tool 102 or change the operating state of tool 102. Commands received from remote controller 106 may be routed from transceiver 406 to PLC 408 for processing by PLC 408. For example, PLC 408 may receive a command from remote controller 106 to change the value of a certain parameter for a specified tool 102 to a particular value. To change an operating state of tool 102, PLC 408 may receive a command from remote controller 106 to change the operating state of tool 102 (e.g., to change from a stopped state to a running state). After processing the command to change the operating state of tool 102, PLC 408 may transmit one or more commands, via I/O device 404, to tool 102 to instruct the tool to perform a specified function.

By way of illustration, if a user issues a command through remote controller 106 to begin making a tubular using tongs, PLC 408 may transmit one or more commands to cause the tongs to grip a first tubular with a first pair of tongs, grip a second tubular with a second pair of tongs, and apply a specified amount of torque to one of the tubulars to make a connection between the first and second tubulars. In another example, if an operator issues a command via remote controller 106 to open a mud bucket, PLC 408 may transmit one or more commands to the mud bucket, thereby causing the mud bucket to open.

Example Screen Content and/or Control Scheme Updating for the Remote Controller

According to embodiments of the present invention, the screen content and/or control scheme of a remote controller used to control a set of tools for hydrocarbon recovery may be updated to support modified tool functionality and/or a modified tool set. Updates to the screen content and/or control scheme may be achieved without updating the hardware or firmware of the remote controller.

Figure 4B:
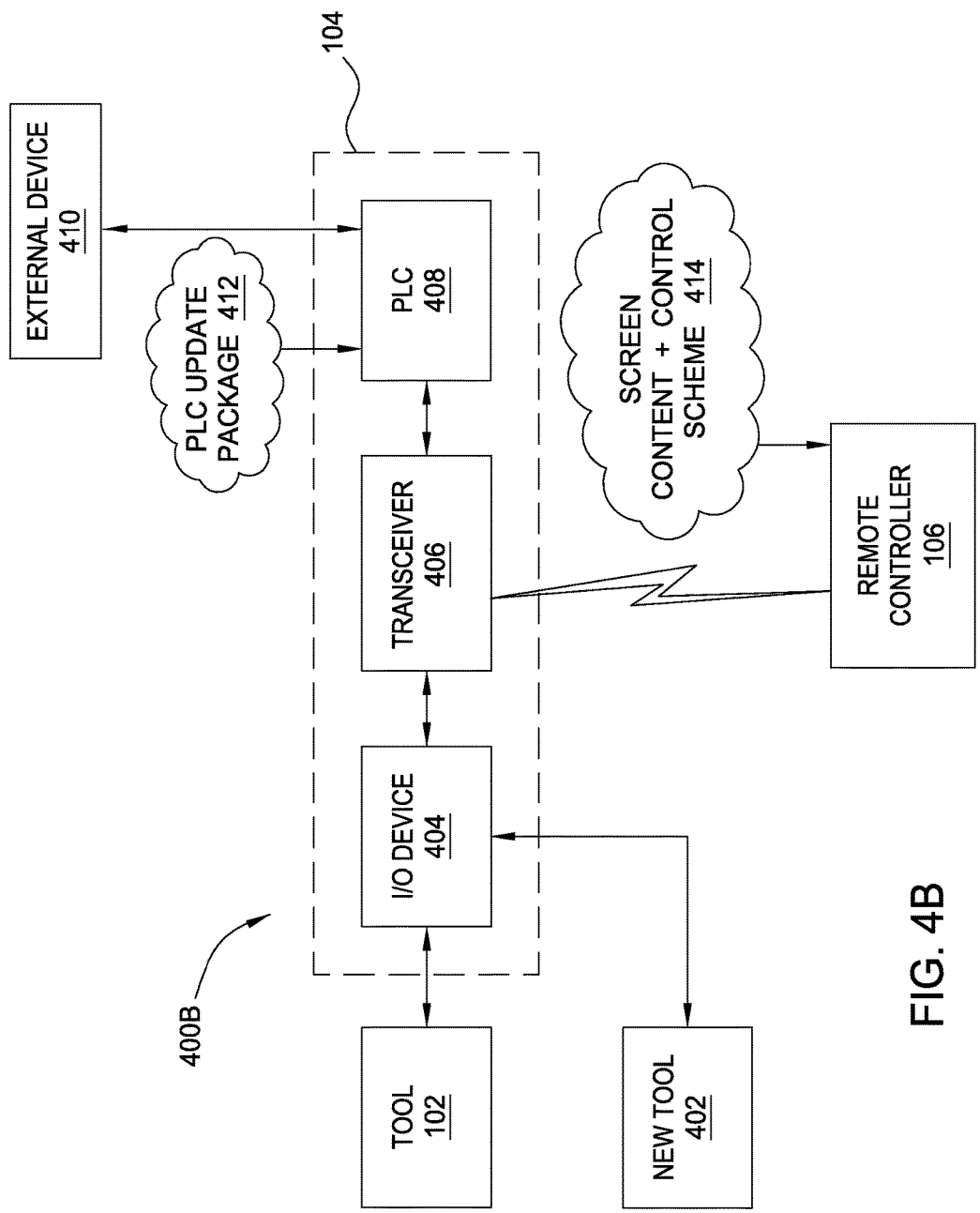
FIG. 4B illustrates the system of FIG. 4A with the addition of a new tool, in accordance with embodiments of the present invention.

FIG. 4B illustrates the tool system of FIG. 4A with the addition of a new tool 402 to the set of tools known to PLC 408. Adding a new tool 402 (or modifying the parameters of an existing tool 102) may entail reprogramming PLC 408 with one or more instructions for operating new tool 402 (or modified existing tool 102). PLC 408 may be reprogrammed by an external device 410 (e.g., a laptop computer) transmitting a PLC update package 412 (e.g., with new information) to PLC 408. PLC update package 412 may allow for a whole or partial overwriting of the existing code stored on PLC 408. That is, PLC update package 412 may comprise the entire set of code used by PLC 408 to operate tool system 400B or comprise instructions to overwrite and/or add code for specific methods directed to modified and/or added functionality. Reprogramming PLC 408 to support the new or modified tool may further entail setting one or more data points indicating that PLC 408 has been reprogrammed, modifying (e.g., adding, deleting, or changing) one or more functions to support the new tool 402 or modified existing tool 102, and modifying information about one or more display screens corresponding to new tool 402 or modified existing tool 102.

Reprogramming PLC 408 may entail stopping operations at PLC 408 before updating one or more functions stored in PLC 408. For example, PLC 408 may be placed in a "programming" mode, which may entail shutting down communication links between PLC 408 and any connected devices (e.g., transceiver 406 and/or I/O device 404). Shutting down communication links between transceiver 406 and PLC 408 may cause remote controller 106 to be disconnected from PLC 408, for example, by causing remote controller 106 to place communication interfaces in an inactive or powered-down state, or by shutting down remote controller 106 in its entirety.

After external reprogramming of PLC 408 is completed, PLC 408 may exit from "programming" mode (e.g., be switched to "run" mode) and resume communications with tools 102, new tool 402, and remote controller 106 through I/O device 404 and/or transceiver 406. Resumption of communications between remote controller 106 and PLC 408 may entail powering on remote controller 106 (or activating one or more previously inactivated communication interfaces) and re-establishing a connection between remote controller 106 and PLC 408 via transceiver 406, for example.

A user can select a tool (e.g., tool 102 or new tool 402) on using one or more input devices (e.g., first or second joysticks 208, 210, or legacy device controls 212). Remote controller 106 may transmit information related to the tool selection to transceiver 406, which may then transmit that information to PLC 408. PLC 408 may process the selected tool information and transmit screen content and control scheme message 414 to remote controller 106 via transceiver 406. Screen content and control scheme message 414 may be unique to each tool and may include information, for example, defining adjustable operating parameters (e.g., upper and lower bounds for numerical parameters) for the selected tool and control schemes for input devices of the remote panel (i.e. correlations between inputs from an input device and actions that may be performed).

For example, a screen content and control scheme message for tongs may include information about a minimum and maximum amount of torque that can be applied to two tubulars, units of measurement, and a mapping (i.e., a control scheme) for the input devices. As an example for tongs, the mapping can inform remote controller 106 that up/down movements by first joystick 208 can change the parameter to be adjusted, left/right movements by first joystick 208 can change the value of the selected parameter, and that pushing second joystick 210 into remote controller 106 can activate the tool. As another example for a mud bucket, the mapping can inform remote controller 106 that up/down movements by first joystick 208 can change the parameter to be adjusted, left/right movements by first joystick 208 can change the state or position of the mud bucket; and that pushing second joystick 210 into remote controller 106 can activate the selected state or cause the mud bucket to be moved to the selected position.

After remote controller 106 receives screen content and control scheme message 414, an operator may control existing tools 102 and/or new tools 402 via one or more commands transmitted from remote controller 106 to PLC 408 via transceiver 406.

Figure 5:
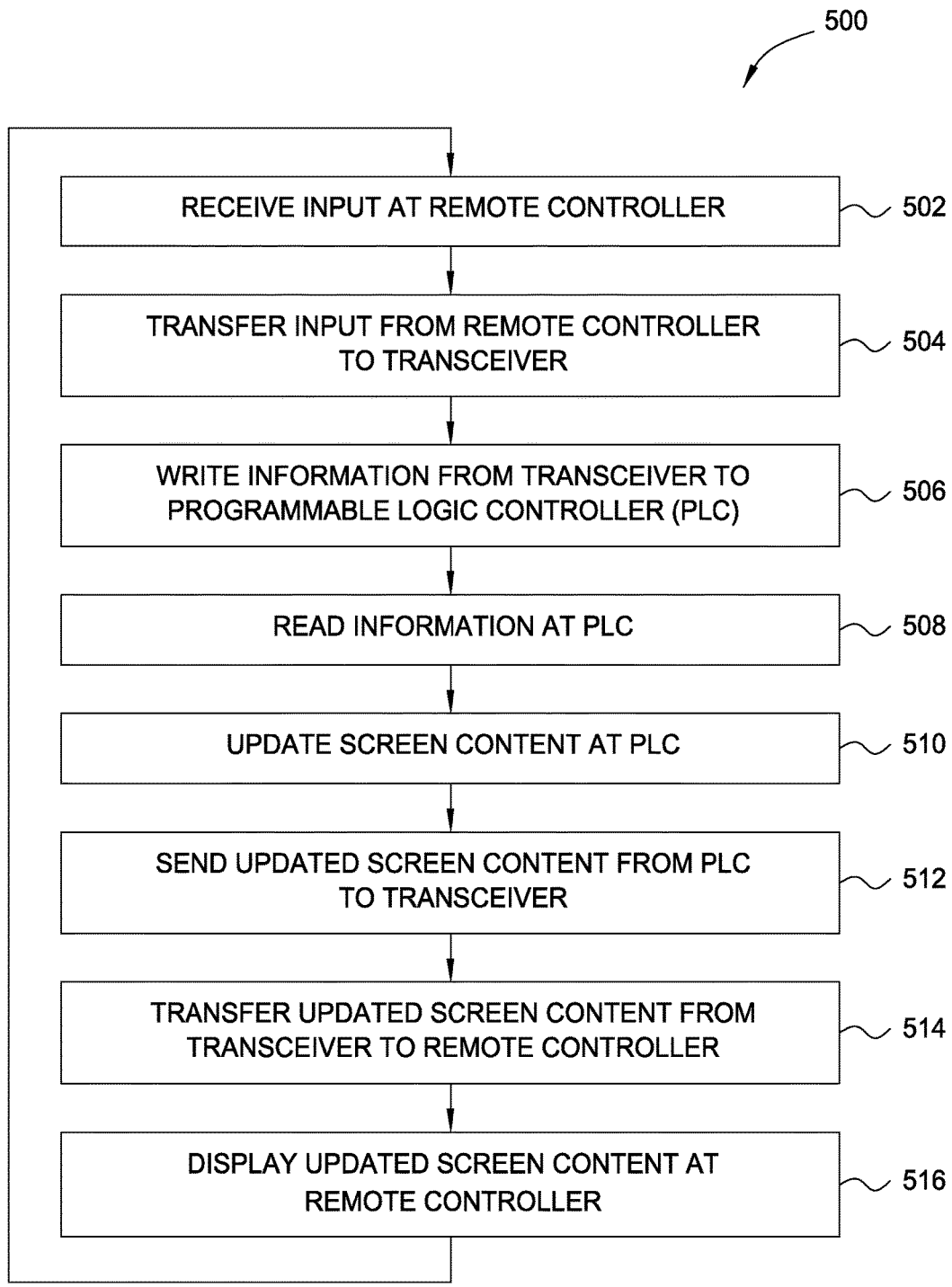
FIG. 5 is a flow diagram of example operations for communicating between a remote controller and a programmable logic controller (PLC), in accordance with embodiments of the present invention.

FIG. 5 illustrates a flow diagram of example operations 500 that may be performed to communicate between remote controller 106 and PLC 408, in accordance with embodiments of the present invention. At 502, remote controller 106 may receive an input from an operator (e.g., via first or second joystick 208, 210 or legacy device controls 212 of remote control panel 200, or via one or more data inputs from HMI 302). At 504, remote controller 106 transfers the input (or an indication thereof) to transceiver 406. At 506, transceiver 406 writes the information received from remote controller 106 to PLC 408. At 508, PLC 408 reads the information. At 510, PLC 408 updates a screen content (e.g. a screen content for remote controller 106 stored in a memory of the PLC) based on the information. At 512, PLC 408 sends the updated screen content to transceiver 406. At 514, transceiver 406 transfers (e.g., wirelessly transmits) the updated screen content to remote controller 106. At 516, remote controller 106 displays the updated screen content (e.g., on screen 202 of remote control panel 200 or HMI 302). Operations 500 may be continually repeated (e.g., operated in a loop).

Figure 6A:
FIGS. 6A-6C illustrate example information displays that may be presented to a user to control tongs, in accordance with embodiments of the present invention.
Figure 6B:
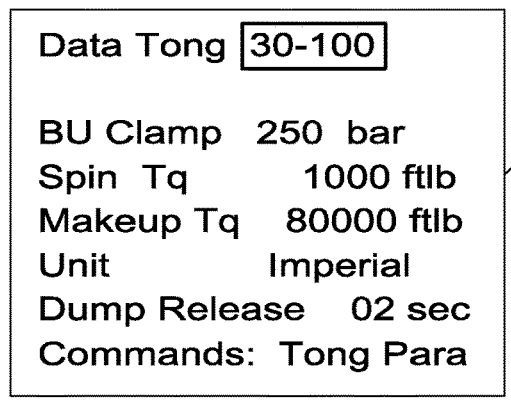
Figure 6C:
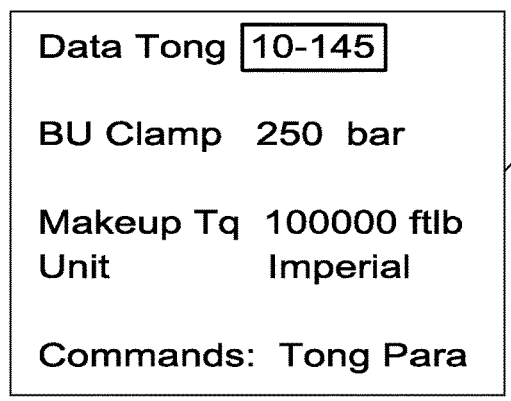

FIGS. 6A-6C illustrate examples of screens that may be displayed to a user (e.g. via display 202 on remote control panel 200 or via HMI 302 on display device 300), in accordance with embodiments of the present invention. A user may be presented, for example, with screen 600 of FIG. 6A, which may show a first command or parameter selected. A user may select the parameter (e.g., via first joystick 208 or second joystick 210 of remote control panel 200 or by selecting a value field 308 in HMI 302). The selected parameter may be modified by the user (e.g., via one or more of joysticks 208 or 210 of remote control panel 200, or by modifying the value in one or more value fields 308 in HMI 302). A user may also change the selected tool, for example, by changing the selected parameter to the tool selection parameter displayed in screen 610 of FIG. 6B and changing the tool displayed on the screen (e.g., via one or more of joysticks 208 or 210 of remote control panel 200) or by selecting a tool via tool selector 304 in HMI 302. As illustrated in the screen 620 of FIG. 6C, the selected tool has been changed from Tongs 30-100 as shown in screen 610 to Tongs 10-145.

Figure 7:
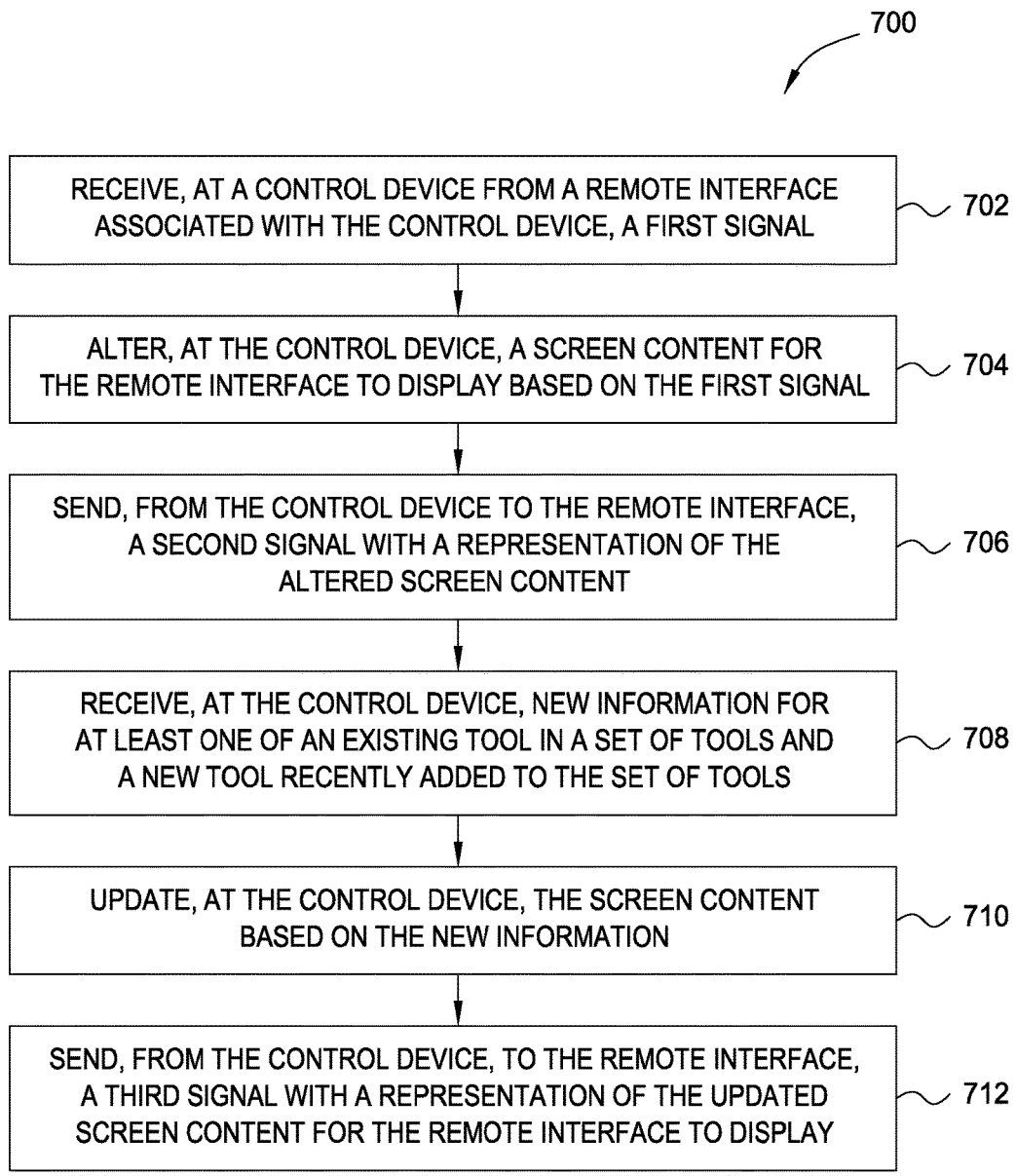
FIG. 7 is a flow diagram of example operations for controlling one or more tools for hydrocarbon recovery, in accordance with embodiments of the present invention.

FIG. 7 illustrates example operations 700 that may be performed by a control device, such as tool controller 104 or PLC 408, to support remote control of a set of tools for hydrocarbon recovery and updating screen content and/or control schemes of a remote interface (e.g., a remote panel) without adding hardware or manually updating the remote interface, in accordance with embodiments of the present invention. Operations 700 may begin at 702, with the control device receiving, from a remote interface associated with the control device, a first signal. At 704, the control device alters a screen content for the remote interface to display based on the first signal. At 706, the control device sends to the remote interface a second signal with a representation of the altered screen content. At 708, the control device receives new information for at least one of an existing tool in the set of tools and a new tool (e.g., a new tool recently added to the set of tools). At 710, the control device updates the screen content based on the new information. At 712, the control device sends, to the remote interface, a third signal with a representation of the updated screen content for the remote interface to display.

For some embodiments, operations 700 may further include storing an initial screen content at the control device for the remote interface to display before altering the screen content based on the first signal at 704

For some embodiments, operations 700 may further entail sending a control signal from the control panel to the existing tool based on the first signal.

For some embodiments, operations 700 may further involve receiving, at the control device from the remote interface, a fourth signal based on the updated screen content. Based on the fourth signal, a control signal may be sent from the control device to the existing tool or new tool. For some embodiments, the updated screen content may comprise a new feature (e.g., a new parameter field). The first signal may be based on a control input at the remote interface, and the fourth signal may be based on the same control input to use the new feature. The control input may comprise a directional motion of a joystick, a position of a rotary control, a state of a switch, or a depression of a button.

For some embodiments, the updated screen content may include a new menu screen for the new tool.

For some embodiments, the new information may be received at the control device from a computer via a direct wired connection, a wide area network (WAN), or a wireless medium.

For some embodiments, the control device comprises a programmable logic controller (PLC).

For some embodiments, the existing tool or the new tool includes tongs, a positioning device, a mud bucket, a top drive, a casing maker, gripping devices (e.g., spiders), a mud pump, a blowout preventer (BOP), bails, interlocks, pickup-laydown machines, control line positioning devices, elevators, compensators, draw works, various field tools (e.g., valves), a cement head, or a release ball. The tongs may be tubing tongs, casing tongs, riser tongs, or drill-pipe tongs, for example.

For some embodiments, the remote interface may be a wireless remote panel, and sending the third signal may entail wirelessly transmitting the third signal to the wireless remote panel via a transceiver connected with the control device.

Figure 8:
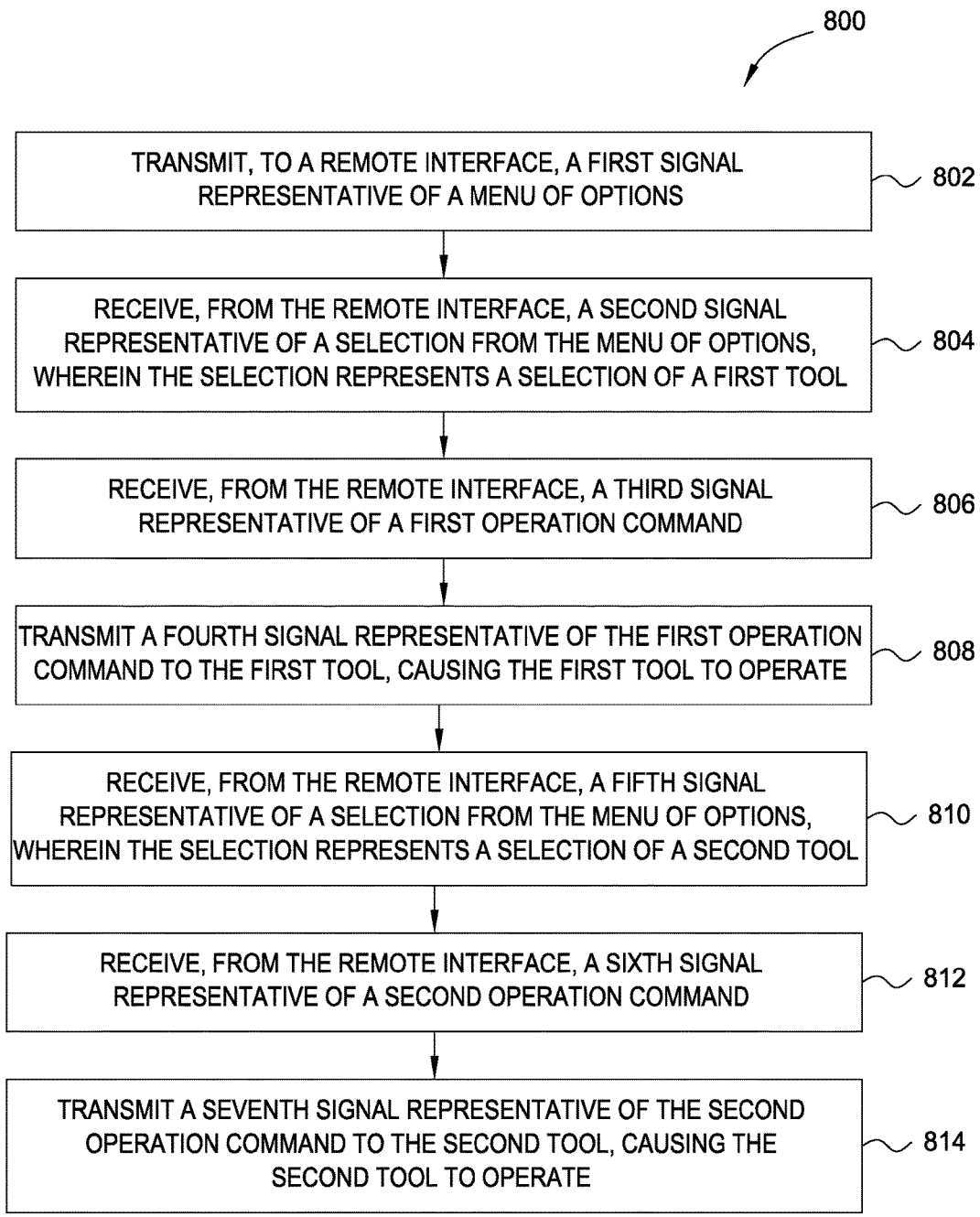
FIG. 8 is a flow diagram of example operations for controlling a tool at a work location, in accordance with embodiments of the present invention.

FIG. 8 illustrates operations 800 that may be performed, for example, by a control device, such as tool controller 104 or PLC 408, to control tools at a work location, in accordance with embodiments of the present invention. Operations 800 may begin at 802, where the control device transmits a first signal representative of a menu of options to a remote interface. At 804, the control device receives from the remote interface a second signal representative of a selection from the menu of options. The selection may represent a selection of a first tool in the set of tools. At 806, the control device receives a third signal representative of a first operation command. At 808, the control device transmits a fourth signal representative of the first operation command to the first tool. The fourth signal may cause the first tool to operate. At 810, the control device receives from the remote interface a fifth signal representative of a selection from the menu of options. The selection may represent a selection of a second tool in the set of tools. At 812, the control device receives from the remote interface a sixth signal representative of a second operation command. At 814, the control device transmits a seventh signal representative of the second operation command to the second tool. The seventh signal may cause the second tool to operate.

Figure 9:
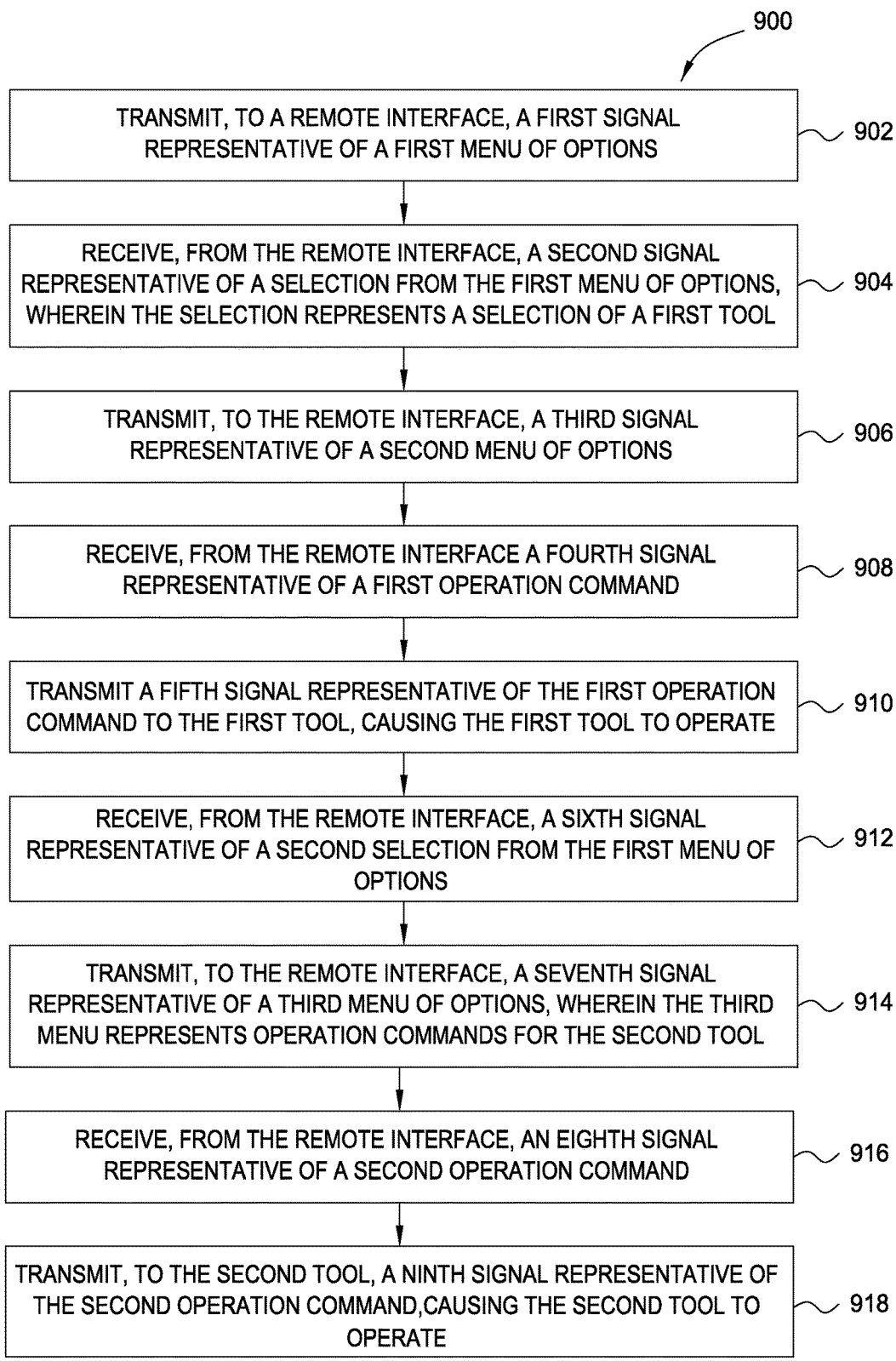
FIG. 9 is a flow diagram of example operations for controlling a tool at a work location, in accordance with embodiments of the present invention.

FIG. 9 illustrates operations 900 that may be performed, for example, by a control device, such as a tool controller 104 or PLC 408, to control tools at a work location, in accordance with embodiments of the present invention. Operations 900 may begin at 902, where the control device transmits a first signal representative of a first menu of options to a remote interface. At 904, the control device receives, from the remote interface, a second signal representative of a first selection from the first menu of options. The selection may represent a choosing of a first tool from a set of tools. At 906, the control device transmits a third signal representative of a second menu of options to the remote interface. The second menu of options may, for example, represent operation commands for the first tool. At 908, the control device receives a fourth signal representative of a first operation command from the remote interface. At 910, the control device transmits a fifth signal representative of the first operation command to the first tool, which may cause the first tool to operate. At 912, the control device receives, from the remote interface, a sixth signal representative of a second selection from the first menu of operations. The second selection may represent, for example, a choosing of a second tool out of the set of tools. At 914, the control device transmits a seventh signal to the remote interface. The seventh signal may be representative of a third menu of options, which may represent operation commands for the second tool. At 916, the control device receives an eighth signal representative of the second operation command from the remote interface. At 918, the control device transmits, to the second tool, a ninth signal representative of the second operation command, thereby causing the second tool to operate.

Figure 10:
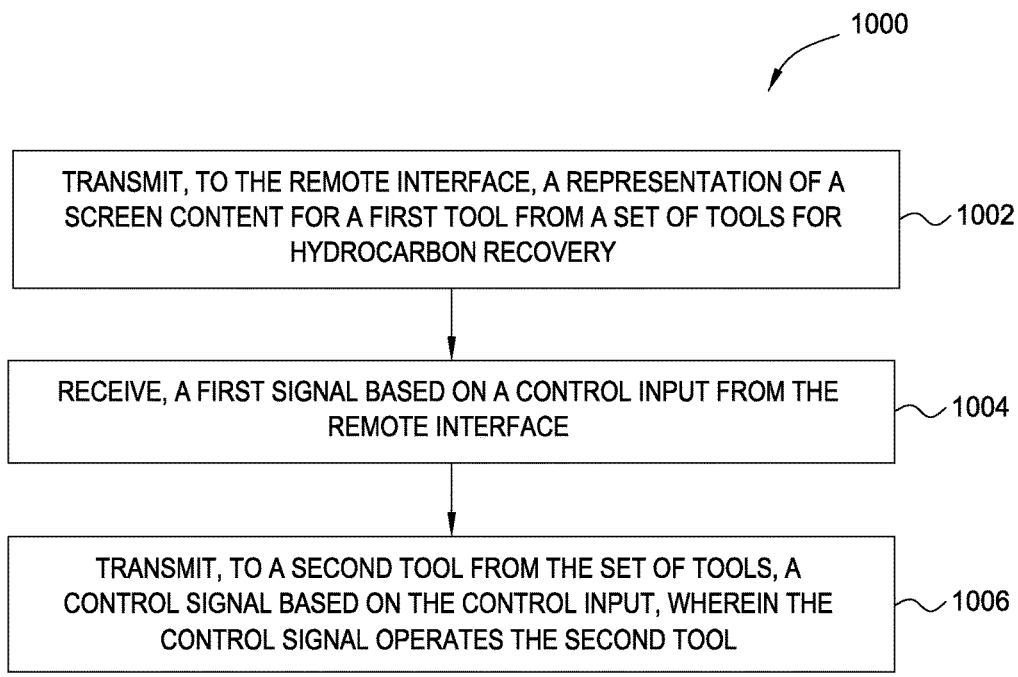
FIG. 10 is a flow diagram of example operations for controlling a set of tools for hydrocarbon recovery, in accordance with embodiments of the present invention.

FIG. 10 illustrates example operations 1000 that may be performed, for example, by a control device, such as a tool controller 104 or PLC 408, to control a set of tools for hydrocarbon recovery. Operations 1000 may begin at block 1002, where the control device transmits to a remote interface a representation of a screen content for a first tool from the set of tools for hydrocarbon recovery. At block 1004, the control device may receive a first signal based on a control input from the remote interface. At 1006, the control device transmits, to a second tool from the set of tools, a control signal based on the control input. The control signal may operate the second tool.

For some embodiments, operations 1000 may further include receiving a second signal at the control device from the second tool; updating, at the control device, a screen content for the remote interface to display based on the second signal; and transmitting, from the control device to the remote interface, a third signal with a representation of the updated screen content for the remote interface to display.

For some embodiments, operations 1000 may further involve receiving, at a control device, information from a first tool. Based on the information, the control device may transmit to the remote interface a signal with a representation of a screen content for the remote interface to display. For example, the previous two operations may precede block 1002.

For some embodiments, the updated screen content may comprise a new menu screen for the second tool.

For some embodiments, the set of tools may comprise one or more of tongs, a positioning device, a compensator, draw works, a top drive, a casing make-up device, a gripping device, a spider, a mud pump, a pickup and laydown tool, an elevator, an interlock, a cement head, a control line positioning tool, a blowout preventer (BOP), bails, or a mud bucket.

Figure 11:
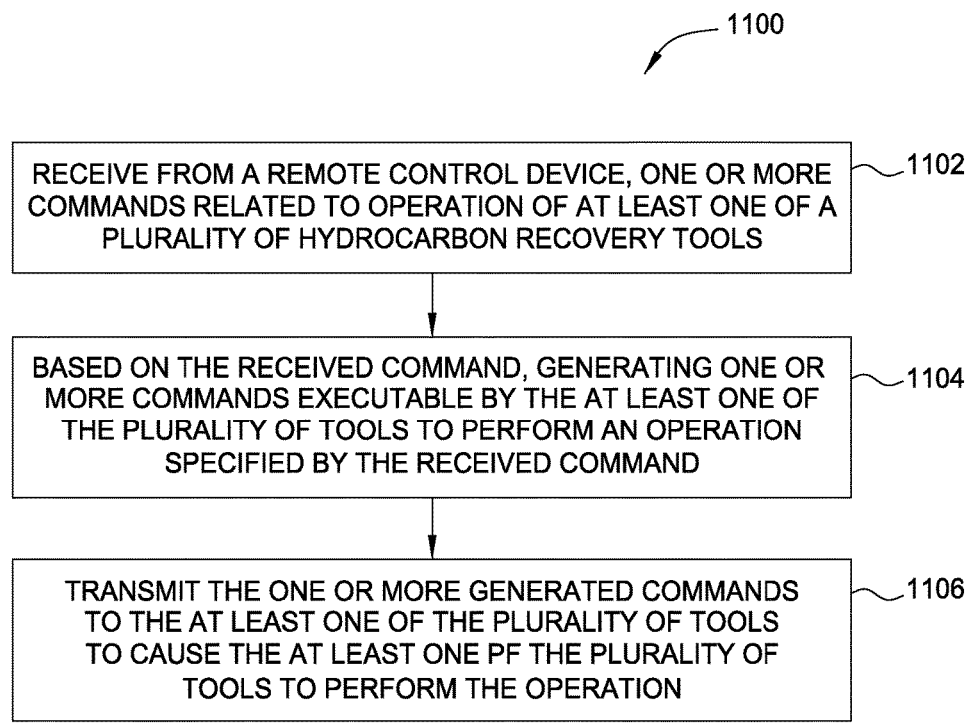
FIG. 11 is a flow diagram of example operations performed by a control device for controlling a plurality of tools in a hydrocarbon recovery system, in accordance with embodiments of the present invention.

FIG. 11 illustrates example operations 1100 that may be performed, for example, by a control device, such as a tool or device controller 104, a PLC 124, or a PLC 408, to control a plurality of hydrocarbon recovery tools. Operations 1100 may begin at block 1102, where the device controller receives, from a remote control device, one or more commands related to operation of at least one of the plurality of hydrocarbon recovery tools. At block 1104, based on the received command, the device controller generates one or more commands executable by the at least one of the plurality of tools to perform an operation specified by the received command. At block 1106, the device controller transmits the one or more generated commands to the at least one of the plurality of tools to cause the at least one of the plurality of tools to perform the operation specified by the received command.

For some embodiments, operations 1100 may further include transmitting, to the remote control device, one or more screens associated with each of the plurality of tools. The one or more screens may include one or more options for operating each tool in the set of tools. The received command may include a command to operate the at least one of the plurality of tools using parameters for the at least one of the plurality of tools modified on the one or more screens. In some embodiments, the at least one of the one or more screens may include one or more screens related to operation of a new tool.

For some embodiments, generating one or more commands executable by the at least one of the plurality of tools to perform an operation specified by the received command comprises generating one or more electronic instructions to command operation of the tool. Additionally, generating one or more commands may include triggering actuation of one or more fluid power devices in fluid communication with the tool. Triggering actuation of the one or more fluid power devices may modify one or more operating parameters of the tool.

Figure 12:
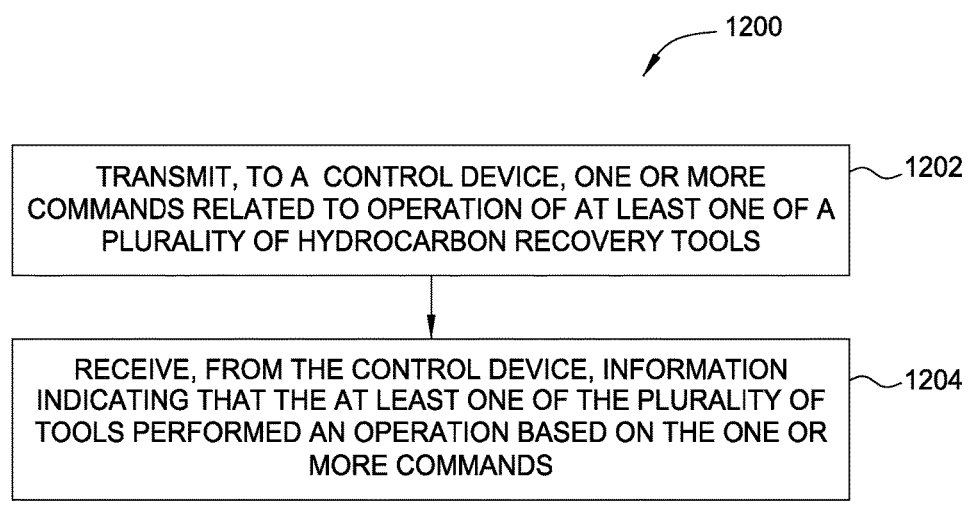
FIG. 12 is a flow diagram of example operations performed by a remote controller for controlling a plurality of tools in a hydrocarbon recovery system, in accordance with embodiments of the present invention.

FIG. 12 illustrates example operations 1200 that may be performed, for example, by a remote controller for controlling a plurality of hydrocarbon recovery tools, according to some embodiments. Operations 1200 may begin at 1202, where the remote controller transmits, to a control device, one or more commands related to operation of at least one of a plurality of hydrocarbon recovery tools. At 1204, the remote controller receives, from the control device, information indicating that the at least one of a plurality of tools performed an operation based on the one or more commands.

For some embodiments, operations 1200 further include receiving, from the control device, one or more screens associated with each of the plurality of tools. The one or more screens may generally include one or more operations for operating each of the plurality of tools. The transmitted one or more commands may generally include a command to operate the at least one of the plurality of tools using parameters for the at least one of the plurality of tools modified on the one or more screens. For some embodiments, at least one of the one or more screens comprises one or more screens related to operation of a new tool.

For some embodiments, the one or more commands include one or more electronic instructions to command operation of the tool. The commands may also include one or more instructions to cause actuation of one or more fluid power units in fluid communication with the tool. Actuation of the one or more fluid power units may be used to modify one or more operating parameters of the tool.

Any of the operations described above, such as the operations 500, 700, 1100, and/or 1200, may be included as instructions in a non-transitory computer-readable medium for execution by the remote controller 106, tool controller 104, PLC 408, or any other processing system. The computer-readable medium may comprise any suitable memory for storing instructions, such as read-only memory (ROM), random access memory (RAM), flash memory, an electrically erasable programmable ROM (EEPROM), a compact disc ROM (CD-ROM), or a floppy disk.

While the foregoing is directed to embodiments of the present invention, other and further embodiments of the invention may be devised without departing from the basic scope thereof, and the scope thereof is determined by the claims that follow.

The invention claimed is:

1. A hydrocarbon recovery system including a plurality of tools, comprising:
  a remote controller; and
  a control device communicatively coupled to the remote controller, the control device configured to:
    store screen content related to operation of each a plurality of tools and a control scheme associated with the screen content related to operation of each of the plurality of tools;
    receive, from the remote controller, a selection of a tool of the plurality of tools to control through the remote controller;

transmit screen content associated with the selected tool to the remote controller for display on the remote controller;

configure one or more input devices of the remote controller according to a control scheme associated with the selected tool, wherein the control scheme defines mappings between movements of the one or more input devices and actions performed with respect to the selected tool based on the movements of the one or more input devices;

receive a command to operate one of the plurality of tools from the remote controller according to the transmitted screen content and control scheme;

based on the command, generate one or more instructions executable by a controller associated with the one of the plurality of tools; and transmit the one or more instructions to the one of the plurality of tools.

2. The hydrocarbon recovery system of claim 1, wherein the screen content comprises one or more menu screens related to operation of one of the plurality of tools from the one of the plurality of tools.

3. The hydrocarbon recovery system of claim 2, wherein the screen content comprises one or more menu screens related to operation of a new tool.

4. The hydrocarbon recovery system of claim 1, wherein the remote controller comprises a portable remote controller.

5. The hydrocarbon recovery system of claim 1, wherein the remote controller comprises:
a touchscreen display;
a processing system configured to generate one or more commands to transmit to the control device based on one or more inputs provided via the touchscreen display; and
a data transceiver configured to transmit the one or more commands to the control device.

6. The hydrocarbon recovery system of claim 1, wherein the remote controller comprises:
a receiver configured to receive screen data from the control device;
a screen;
a first joystick and a second joystick;
a processing system configured to:
display the received screen data on the screen;
receive input from at least the first and the second joysticks;
modify the screen data displayed on the screen; and
generate one or more commands to transmit to the control device based on the input; and
a transmitter configured to transmit the generated one or more commands to the control device.

7. The hydrocarbon recovery system of claim 6, wherein the remote controller further comprises one or more switches, and wherein the processing system is configured to generate one or more commands based on a position of each of the one or more switches.

8. The hydrocarbon recovery system of claim 1, wherein the control device is configured to receive a command to operate one of the plurality of tools from the remote controller via a wireless interface.

9. The hydrocarbon recovery system of claim 1, wherein the control device comprises:
a data transceiver;
a processor configured to:
receive, via the data transceiver, a first command to operate one of the plurality of tools; and
generate one or more second commands executable by the one of the plurality of tools based on the first command; and
an input/output (I/O) interface configured to transmit the one or more second commands to the one of the plurality of tools.

10. The hydrocarbon recovery system of claim 9, wherein:
the control device further comprises one or more fluid power units in fluid communication with at least one of the plurality of tools; and
the processor is further configured to actuate at least one of the one or more fluid power units, in response to the first command.

11. The hydrocarbon recovery system of claim 1, wherein the remote controller and the control device are integrated in a single physical unit.

12. The hydrocarbon recovery system of claim 1, wherein the command comprises a command to operate a first tool via a second tool coupled to the first tool, and wherein the transmitting one or more instructions comprises transmitting the instruction to the second tool.

13. A method for hydrocarbon recovery, comprising:
receiving, from a remote control device, a selection of a tool of a plurality of hydrocarbon recovery tools to control through the remote control device;
transmitting, to the remote control device, one or more screens associated with the selected tool, the one or more screens including one or more options for operating the selected tool;
configuring one or more input devices of the remote control device according to a control scheme associated with each of the one or more screens associated with the selected tool, wherein the control scheme defines mappings between movements of the one or more input devices of the remote control device and actions performed with respect to the one or more screens based on user input through the one or more input devices;
receiving, from the remote control device, one or more commands related to operation of the selected tool according to the transmitted one or more screens and the control scheme;
based on the received one or more commands, generating one or more commands executable by the selected tool to perform an operation specified by the received one or more commands; and
transmitting the one or more generated commands to the selected tool to cause the selected tool to perform the operation.

14. The method of claim 13, wherein the received one or more commands comprise a command to operate the selected tool using parameters for the selected tool modified on one of the one or more screens.

15. The method of claim 14, wherein at least one of the one or more screens comprises one or more screens related to operation of a new tool.

16. The method of claim 13, wherein the generating one or more commands comprises:
generating one or more electronic instructions to command operation of the tool; and
triggering actuation of one or more fluid power devices in fluid communication with the tool to modify one or more operating parameters of the tool.

17. A non-transitory computer readable medium comprising instructions that, when executed by one or more processors, executes a method for hydrocarbon recovery, the method comprising:

receiving, from a remote control device, a selection of a tool of a plurality of hydrocarbon recovery tools to control through the remote control device;

transmitting, to the remote control device, one or more screens associated with the selected tool, the one or more screens including one or more options for operating the selected tool;

configuring one or more input devices of the remote control device according to a control scheme associated with each of the one or more screens associated with the selected tool, wherein the control scheme defines mappings between movements of the one or more input devices of the remote control device and actions performed with respect to the one or more screens based on user input through the one or more input devices;

receiving, from the remote control device, one or more commands related to operation of at least one of the plurality of hydrocarbon recovery tools according to the transmitted one or more screens and the control scheme;

based on the received one or more commands, generating one or more commands executable by the selected tool to perform an operation specified by the received one or more commands; and transmitting the one or more generated commands to the selected tool to cause the selected tool to perform the operation.

18. The non-transitory computer readable medium of claim 17, wherein the received one or more commands comprise a command to operate the selected tool using parameters for the selected tool modified on one of the one or more screens.

19. The non-transitory computer readable medium of claim 18, wherein at least one of the one or more screens comprises one or more screens related to operation of a new tool.

20. The non-transitory computer readable medium of claim 17, wherein the generating one or more commands comprises:
  generating one or more electronic instructions to command operation of the tool; and
  triggering actuation of one or more fluid power devices in fluid communication with the tool to modify one or more operating parameters of the tool.

21. A method for hydrocarbon recovery, comprising:
  transmitting, to a control device, a selection of a tool of a plurality of hydrocarbon recovery tools to control;
  receiving, from the control device, one or more screens associated with the selected tool, the one or more screens including one or more options for operating the selected tool;
  receiving a control scheme associated with the one or more screens, the control scheme defining mappings between movements of one or more input devices of a remote control device and actions performed with respect to the selected tool based on the movements of the one or more input devices;
  configuring the one or more input devices according to the received control scheme;
  transmitting, to the control device, one or more commands related to operation of at least one of a plurality of hydrocarbon recovery tools according to the received one or more screens and control scheme; and
  receiving, from the control device, information indicating that the at least one of a plurality of tools performed an operation based on the one or more commands.

22. The method of claim 21, wherein the transmitted one or more commands comprises a command to operate the at least one of the plurality of tools using parameters for the at least one of the plurality of tools modified on one of the one or more screens.

23. The method of claim 22, wherein at least one of the one or more screens comprises one or more screens related to operation of a new tool.

24. The method of claim 21, wherein the one or more commands comprises:
  one or more electronic instructions to command operation of the tool; and
  one or more instructions to cause actuation of one or more fluid power units in fluid communication with the tool to modify one or more operating parameters of the tool.

25. A non-transitory computer readable medium comprising instructions that, when executed by one or more processors, executes a method for hydrocarbon recovery, the method comprising:
  transmitting, to a control device, a selection of a tool of a plurality of hydrocarbon recovery tools to control;
  receiving, from the control device, one or more screens associated with the selected tool, the one or more screens including one or more options for operating the selected tool;
  receiving a control scheme associated with the one or more screens, the control scheme defining mappings between movements of one or more input devices of a remote control device and actions performed with respect to the selected tool based on the movements of the one or more input devices;
  configuring the one or more input devices according to the received control scheme;
  transmitting, to the control device, one or more commands related to operation of at least one of a plurality of hydrocarbon recovery tools according to the received one or more screens and control scheme; and
  receiving, from the control device, information indicating that the at least one of a plurality of tools performed an operation based on the one or more commands.

26. The non-transitory computer readable medium of claim 25, wherein the transmitted one or more commands comprises a command to operate the at least one of the plurality of tools using parameters for the at least one of the plurality of tools modified on one of the one or more screens.

27. The non-transitory computer readable medium of claim 26, wherein at least one of the one or more screens comprises one or more screens related to operation of a new tool.

28. The non-transitory computer readable medium of claim 25, wherein the one or more commands comprises:
  one or more electronic instructions to command operation of the tool; and
  one or more instructions to cause actuation of one or more fluid power units in fluid communication with the tool to modify one or more operating parameters of the tool.

* * * * *